April 17, 1962 W. T. RENTSCHLER 3,029,718
PHOTOGRAPHIC CAMERA
Filed Sept. 2, 1959

INVENTOR.
Waldemar T. Rentschler
BY
Munn, Liddy, Daniels & March
ATTORNEYS

United States Patent Office 3,029,718
Patented Apr. 17, 1962

3,029,718
PHOTOGRAPHIC CAMERA
Waldemar T. Rentschler, Calmbach (Enz), Germany, assignor to Alfred Gauthier, G.m.b.H., Calmbach (Enz), Germany, a corporation of Germany
Filed Sept. 2, 1959, Ser. No. 837,710
Claims priority, application Germany Sept. 20, 1958
1 Claim. (Cl. 95—10)

This invention relates to photographic cameras of the type wherein a single exposure-value setting member or device is provided, said setting member or device being coupled to an exposure meter carried by the camera, which functions to indicate the proper setting of the exposure-value setting member.

Cameras constructed in the above manner have the advantage that the operator is not required to perform any calculations or to engage in any other mental activity in order to properly set the camera for an exposure. The only procedure which is still required merely consists in bringing the tracing member of the exposure meter in coincidence with a movable pointer or indicator of the meter, which pointer in the case of daylight exposures is automatically controlled by the existing light conditions. In order to enable this same ease of adjustment to be had where flash exposures are to be made, it has already been proposed to combine the exposure-value setting member with another setting device whose function is to automatically adjust the diaphragm in accordance with the distance, sensibility factor of the film, and also the type of flash-bulb which is to be used.

An object of the present invention is to provide an improved camera having an exposure-value setting member coupled with an exposure meter as outlined above, which may be easily set for flash exposures as well as for daylight pictures, which is extremely simple and reliable in its operation as regards the setting for film sensibility, and which has an uncomplicated structure of the setting mechanism for film sensibility, characterized by extremely few parts.

A feature of the invention resides in the provision of an improved simplified camera-setting structure as above set forth, which is flexible in the arrangement of the parts and especially with respect to the organization and construction of the exposure meter and the coupling connection between the latter and the exposure-value setting device, resulting in a desirable freedom or choice of selection as regards the placement and arrangement of these components and structures.

In accomplishing the above, in accordance with the invention, provision is made for taking into account different film sensibilities by providing on the exposure-value setting member an additional setting member which is adjustable with respect to the first setting member and which is drivingly connected to a control member constituting a part of the coupling connection between the exposure-value setting member and the exposure meter. A film sensibility scale and a setting or index mark are associated with the exposure-value member and with the said additional member to enable proper settings of the latter to be had, and there is further provided a settable indicating device which is connected with the said additional setting member, for providing an indication in terms of distance, by which adjustment of the exposure-value setting member will effect a setting of the diaphragm automatically to a value suitable for flash exposures in accordance with the distance.

In addition to the reliable operation which results from the provision of the exposure-value setting device, a camera constructed in the above-described manner has the advantage of extreme simplicity and reliability of operation with regard to the setting or adjustment for film sensibility, which is effected simultaneously both for daylight and flash exposures by the disclosed arrangement as provided by the invention. When changing from one type of exposure to the other, the operator is not required to reset the camera, but instead is relieved of any uncertainty, and of the necessity for remembering or thinking about the setting. In addition to the above, the camera of the present invention has an advantageous structure characterized by relatively few parts which are simple and economical to produce; moreover, it enables the exposure meter to be mounted in or on the camera in a freely selected manner, and especially in a fully enclosed organization which would not be subjected to handling, since the adjustments for film sensibility and for other exposure factors are made directly on the exposure-value setting device and not at the exposure meter.

A further advantage of the present improved camera results from the fact that the correlation of the said additional setting member with the range or distance scale is accomplished by the provision of a second additional setting member which is relatively adjustable with respect to both the exposure-value setting member and the said first additional setting member, and that the two additional relatively adjustable setting members can be secured in different relative positions by means of a releasable coupling device. A flash-bulb type scale and a setting or index mark therefor may be associated with the said additional members to readily enable flashbulb factors to be taken into consideration, in the simplest possible manner.

By such construction of the camera it is possible to easily take into consideration flash light sources providing different light intensities, and accordingly the operator has the advantage of an automatic setting of the diaphragm when taking flash pictures which is valid and accurate over a wide range of values.

An embodiment of the invention, comprising a camera having a photographic intra-lens shutter, is illustrated in the accompanying drawings and described in detail in the following specification. The drawings and specification will explain further the above-mentioned features and advantages, as well as others resulting from the invention.

Figure 3:
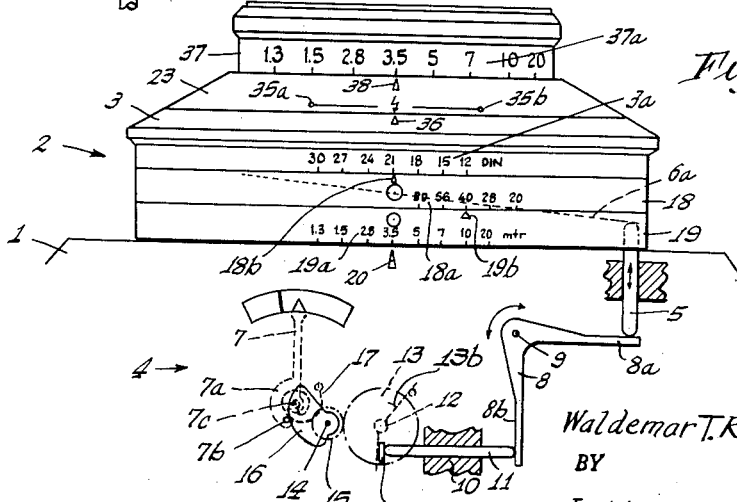
FIG. 3 is a diagrammatic view of a portion of a photographic camera as provided by the invention, illustrating the intra-lens shutter construction of FIGS. 1 and 2 and also an exposure meter having a tracing member which is coupled to the exposure-value setting device by means of a mechanical transmission.

Referring first to FIG. 3, the casing or housing of the camera is indicated by the numeral 1. Mounted on the front of the casing 1 is a photographic intra-lens shutter assemblage 2 having an exposure-value setting device or member 3, an exposure meter measuring device is indicated generally by the numeral 4.

The measuring device 4 has a tracing member 7 which is coupled so as to be actuated in response to setting or adjusting movement of the exposure-value setting member 3, and the said coupling or transmission includes a transmission pin 5 which is longitudinally movable, as indicated by the double pointed arrow in FIG. 3, in a direction parallel to the optical axis of the intra-lens shutter assembly 2. One end of the pin 5 engages a cam-type control member 6, 6a to be actuated thereby, the said control member being connected with the exposure-value setting member 3 in a manner described below.

Axial shifting movement of the pin 5 is transmitted to the tracing member or settable pointer 7 of the measuring device 4 by means of a bell crank 8 which is pivotally mounted on the casing 1 of the camera for movement about an axis or spindle 9. One arm 8a of the bell crank 8 engages the remaining end of the transmission pin 5 while the other arm 8b engages a pin 11 carried in a guide bushing 10. The pin 11 engages a lug 13a disposed in a plane which is perpendicular to the plane of the drawing, the said lug being carried by a gear 13 mounted on a spindle 12 and meshing with a gear or pinion 15 secured to a spindle 14. The spindle 14 carries a cam 16, which is fixedly secured to the pinion or gear 15. The cam 16 actuates a cam follower 7b which is fixedly carried on a lever 7a of a tracing member 7 pivotally mounted by means of a spindle 7c and biased in a counter-clockwise direction by a spring 17. The bias imparted to the tracing member 7 causes the cam follower 7b to remain in engagement with the driving cam 16, as will be readily understood. Also, a spring 13b provides a counter-clockwise bias to the gear 13, to maintain the various abutting parts 13a, 11, 8, 5 and 6 of the transmission in engagement with each other.

For the purpose of enabling the operator to set the camera in the simplest possible manner and with the least difficulty for different film sensibilities with regard to both daylight and flash exposures, while at the same time providing the greatest possible freedom of selection as regards the arrangement of the exposure meter and the coupling between the latter and the exposure-value setting member there is provided by the invention a novel organization comprising a settable member or ring 18 which is carried on the exposure-value setting member 3 and which is adjustable with respect thereto, the ring 18 being drivingly connected to a control member 6 constituting a part of the coupling or transmission to the exposure meter. In conjunction with such settable member 18 there is provided a film sensibility scale 3a and a setting or index mark 18b which are associated respectively with these two setting members. In addition, the relatively adjustable, settable member 18 (which is also hereinafter referred to as a film-sensibility adjustment member) is connected to a settable indicating device, which latter provides an indication in terms of range or distance, by which adjustment of the exposure-value setting member will automatically effect a setting of the diaphragm to a value suitable for flash exposures in accordance with the range or distance.

In order to enable the camera as provided by the invention to have a relatively large or comprehensive useful range or scope in the taking of flash exposures, there is further provided an additional setting member 19 by which the film sensibility adjustment member 18 may be readily referred to or correlated with the range or distance setting adjustment of the camera. The additional setting member 19 is adjustable with respect to both the exposure-value setting member 3 and also the sensibility adjustment member 18, and the two relatively adjustable members 18, 19 are secured together in different relative positions for concurrent movement by means of a releasable coupling device 28.

Further, there is provided a flash-bulb type identification scale 18a and an index mark 19b, respectively associated with the members 18 and 19 for the purpose of establishing the relative positions of the said members in accordance with the different flash-bulb intensities.

Figure 2:
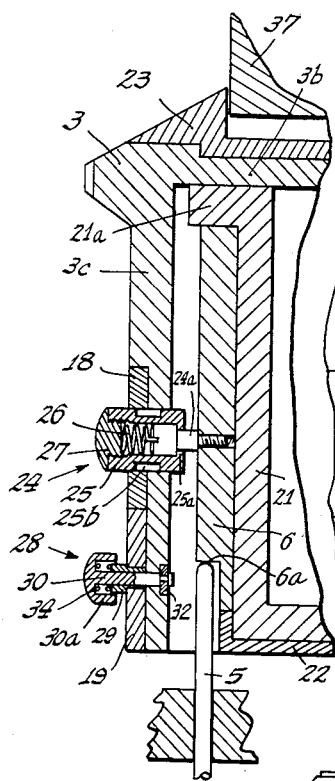
FIG. 2 is an enlarged fragmentary sectional view taken on the line 2—2 of FIG. 1, showing the arrangement of the exposure-value setting device and of the carriers which have the various scales, and further showing a control member on the shutter housing, constituting a part of the coupling connection between the exposure-value setting member and the exposure meter.

Referring to FIG. 2, the control or cam member 6 is constituted as a ring, which is positioned concentrically with respect to the axis of the shutter and which bears on the side wall 21 of the shutter housing. The rear edge portion of the cam ring 6 (that edge portion facing the camera) carries a helical cam edge 6a. The cam ring 6 is prevented from having axial movement by engagement with a collar 21a provided on the front of the side wall 21 of the housing, and by engagement adjacent the cam 6a with a disc 22 fixed to the rear of the shutter housing.

As further shown in FIG. 2, the exposure-value setting member 3 is also constituted as a ring, which is positioned concentrically with respect to the shutter axis, said ring having a rotary bearing on a short tubular structure (not shown) carried by the shutter base plate and which is well known in the art. The ring 3 is prevented from having axial movement by engagement on the one hand with a front plate 23 which encloses the front of the shutter assemblage and on the other hand by engagement of the rear surface of the bearing portion 3b with the front edge of the side wall 21 of the shutter housing.

Figure 1:
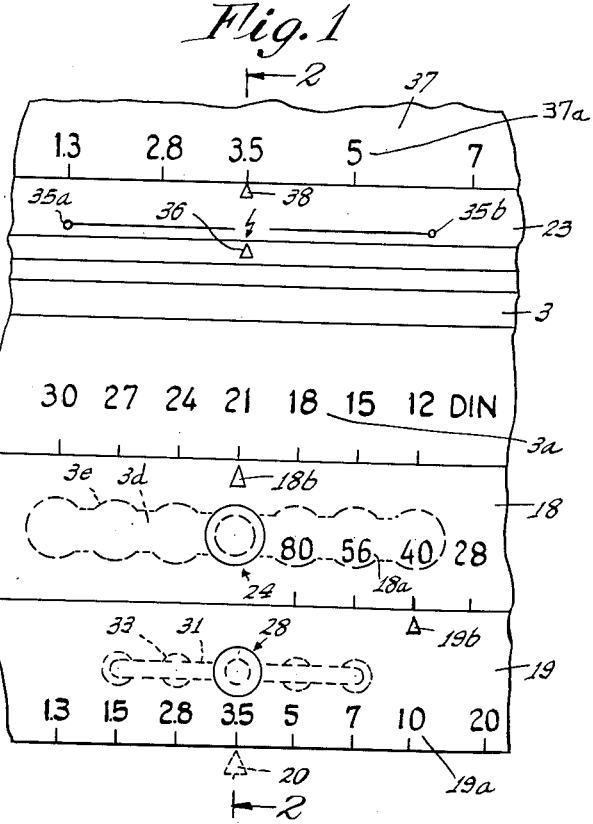
FIG. 1 is an enlarged fragmentary top plan view of an intra-lens shutter construction in a camera as provided by the invention, showing portions of the exposure-valve setting device and the scale carriers thereon having the range or distance scale, film sensibility scale, and flash-bulb type scale.

The exposure-value setting ring 3 is further provided with a rearwardly extending cylindrical jacket 3c which overlaps the shutter housing 1, and the said jacket is provided on its outer surface with a film-sensibility scale 3a. As seen in FIGS. 1 and 2, the scale 3a is carried by a forward portion of the jacket 3c, which portion has a larger external diameter and is outwardly offset from rear portions of the jacket, the said rear portions providing bearing surfaces for members 18 and 19, which are constructed in the form of rings.

The flashbulb identification mark scale 18a which enables various light intensities of different flashbulbs to be taken into account, is provided on the external surface of the ring 18, as seen in FIGS. 1 and 3. The scale 18a is laid out in a well known manner, and comprises a sequence of well-known guide numbers (each guide number equaling a diaphragm number multiplied by the distance in meters) established for a film sensibility of 17° DIN (German industrial standards). Alternatively, the trade names of flashbulb types, or else special symbols could be arranged as identifiaction marks on the scale 18a.

In addition to the scale 18a, the ring 18 is provided with an index mark 18b to provide for settings which take into account different film sensibilities, the mark 18b being referred to the film sensibility scale 3a. The ring 19 is provided with an index mark 19b arranged to be referred to the flashbulb scale 18a, and the said ring also carries a range or distance scale 19a which is co-operable with an index mark 20 fixedly mounted on the camera casing, thereby to enable settings to be made with reference to distances, where flash-light pictures are indicated. For the purpose of transmitting the adjusting movement of the exposure-value setting member 3 to the control member or ring 6 which is coupled to the tracing member 7 of the exposure meter, there is provided a releasable coupling device 24 which is carried by the control member 6. This releasable coupling device 24 comprises a shouldered pin 24a which is fixedly attached to the control ring 6, as by being screwed into the latter, the said pin extending radially outward with respect to the shutter axis and carrying a sleeve 25 which passes through the exposure-value setting member 3 and also through the sensibility adjustment member or ring 18. The sleeve 25 is retained and held captive on the pin 24a by means of an inwardly extending flange 25a provided on its inner end, and is axially shiftable on the pin in a direction which is radially inward or toward the axis of the shutter. Such shifting movement of the sleeve 25 is against the action of a helical compression spring 26 which is provided on the interior of the sleeve and which engages the outer end of the pin 24a and also a closure member or button 27 affixed to the sleeve.

For the purpose of enabling adjustment of the ring 18 to be made with respect to the exposure-value setting member 3 in order to take into account film sensibility values or factors, an irregular or notched slot 3d having equidistant notches or recesses 3e is provided in the cylindrical mantle 3c of the exposure-value setting member 3. The slot 3d extends circumferentially of the mantle or jacket 3c, and the spacing between the recesses 3e corresponds to the graduations of the film sensibility scale 3a which is provided on the ring 3. To enable the sleeve 25 of the releasable coupling device to properly cooperate with the slot 3d, the sleeve is provided with an annular groove 25b, as clearly shown in FIG. 2.

When the sleeve 25 is moved inward or toward the axis of the shutter, compressing the spring 26, the annular groove of the sleeve 25 becomes aligned with the slot 3d, whereas the cylindrical locking portion of the sleeve 25 (the innermost end portion of the sleeve) is shifted out of engagement with one of the notches 3e. Accordingly, the film sensibility adjustment member 18 is now free to be shifted on the cylindrical jacket 3c, and adjustment may be made for film sensibility in a very simple and clear manner by causing the index mark 18b to coincide with the proper film sensibility value on the scale 3a. When the ring 18 is rotated or shifted, the control member 6 and cam 6a are also turned by virtue of the connection through the shouldered pin 24a. After the coupling 24 is released, the innermost cylindrical locking portion of the sleeve 25 will snap back into one of the notches or recesses 3e, thereby to positively couple the setting ring 3 to control member 6 in the newly-arrived-at relative positions.

As already mentioned above, the index mark 19b is provided on the ring 19 for the purpose of taking into account the specific flashbulb types as set forth on the scale 18a. A positive driving connection is established between the ring 19 and the exposure-value setting ring 3 by means of a releasable coupling device 28. This device comprises a guide bushing 29 which is riveted to the ring 19, and by an axially shiftable coupling pin 30 slidably carried in the bushing 29. The coupling pin 30 passes through the cylindrical jacket 3c, being accommodated in a circumferentially extending slot 31 provided in the said jacket, and the innermost end of the pin 30 is provided with a locking member in the form of a circular head 32 which is adapted to be received in equidistant notches or recesses 33 provided in the slot 31 and having the same size or area as the locking head.

A manually engageable button 30a is provided on the outer end of the pin 30, beyond the outside periphery of the ring 19, said button having an annular skirt adapted to overlap or enclose the bushing as shown. Inside the button 30a there is provided a helical compression spring 34, arranged to abut the outer end of the bushing 29 and also the interior of the button 30, thereby to continually bias the pin 30 outwardly and to yieldably hold the locking head 32 in one of the recesses 33.

The positive driving connection between the ring 19 and the exposure-value setting member 3 is rendered inoperative when the coupling pin 30 is depressed or moved radially inward against the action of the return spring 34. As soon as the locking head 32 leaves the associated recess, it is possible to freely adjust or turn the ring 19 for the purpose of effecting a setting for the specific flashbulb which is to be used, utilizing the index mark 19b and the flashbulb scale 18a. Upon release of the coupling pin 30, the driving connection between the ring 19 and the exposure-value setting member 3 is automatically restored or rendered operative.

For the purpose of clearly indicating to the operator the part of the adjustment range of the exposure-value setting member 3 wherein a uniform change of the diaphragm with respect to arcuate movement of the member 3 occurs, there are provided markings 35a and 35b on the front stationary plate 23 of the intra-lens assemblage, to identify that portion of the range of the exposure-value setting member 3 which is suitable for flash exposures and which is associated with such uniform value of the diaphragm opening. A setting or index mark 36 is provided on the exposure-value setting ring 3, which mark may be referred to the markings 35a and 35b to enable the above part of the range to be readily recognized.

Setting of the exposure range or distance is done in a manner well known, by means of a distance setting ring 37 arranged forwardly of the front plate 23 of the shutter construction and connected to an adjustable front lens (not shown), the said ring having a scale 37a which may be shifted with respect to the stationary index mark 38 on the front plate 23.

With the organization as above set forth there is effected an automatic setting of the diaphragm, when flashlight exposures are to be made, taking into account the range or distance, the film sensibility, and the type of flashbulb in a very simple and easily understandable manner, by the operator merely determining the distance either through judgment or else by means of a range finder or equivalent device, and setting the range adjustment member 37 to bring the desired distance value on the scale 37a into coincidence with the index mark 38. As shown in FIG. 1, a distance of 3.5 is indicated, this being the distance that the adjustable front lens has been set for. This distance, for which the member 37 has been set, is now utilized in connection with the scale 19a and the index mark 20. To do this, the exposure-value setting member 3 is adjusted, to bring the selected distance value (in the present case, the number 3.5) in coincidence with the index mark 20. When this is done, the diaphragm will be automatically set for proper flash exposures, using a flash bulb type such as is indicated by the index mark 19b and the scale 18a, and utilizing a film having a sensibility as indicated by the index mark 18b and the sensibility scale 3a.

Instead of using the disclosed setting device for effecting an automatic adjustment of the diaphragm suitable for flash exposures as illustrated herein, it would be possible to arrange a mechanical coupling device of a kind well known by itself, between the range or distance setting ring 37 and the setting ring 19. Such an organization would provide a still greater simplicity of operation. However, it would have the drawback that additional parts and components would be required, resulting in increased cost and a more complicated construction, and further it would require that the adjusting characteristics of the distance setting member 37 and the exposure-value setting member 3 correspond with each other as regards their graduations.

The advantages as provided by the present invention, regarding operational simplicity and reliability in setting the camera for film sensibility are always insured to an optimum degree, independently of the kind of setting device which is used for effecting automatic adjustment of the diaphragm where flash exposures are to be made.

I claim:

In a photographic camera of the type having a single exposure-value setting member and having an exposure meter and a coupling device connecting the latter to the exposure-value setting member, said coupling device including a movable control member, the improvement which comprises a manually shiftable film-sensibility adjustment member adjustably mounted on the exposure-value setting member and drivingly connected to the said control member to actuate the latter; a film-sensibility scale and index mark therefor, connected with the exposure-value setting and film-sensibility adjusting members; and a settable indicating device connected with the said sensibility-adjustment member, for providing an indication in terms of distance by which adjustment of the exposure-value setting member will effect a setting of the diaphragm automatically to a value suitable for flash exposures in accordance with the distance, said settable indicating device including a movable member which is adjustable with respect to both the exposure-value setting member and the film sensibility adjustment member, and spring biased means for releasably coupling the sensibility-adjustment member and the said movable member in different relative positions, and a flash bulb type scale and an index mark therefor, are associated with the said coupled members.

References Cited in the file of this patent

UNITED STATES PATENTS

| | | |
|---|---|---|
| 2,351,834 | Phillips | June 20, 1944 |
| 2,418,370 | Simmon | Apr. 1, 1947 |
| 2,887,026 | Rentschler | May 19, 1959 |
| 2,917,984 | Faulhaber | Dec. 22, 1959 |